United States Patent
Elad et al.

(10) Patent No.: US 11,709,226 B2
(45) Date of Patent: *Jul. 25, 2023

(54) CALIBRATING ARRAY ANTENNAS BASED ON SIGNAL ENERGY DISTRIBUTION AS A FUNCTION OF VELOCITY

(71) Applicant: AyDeeKay LLC, Aliso Viejo, CA (US)

(72) Inventors: Danny Elad, Kibutz Matsuva (IL); Marko Mlinar, Horjul (SI); Simon Srot, Ljubljana (SI); Dan Corcos, Tel Aviv (IL)

(73) Assignee: Ay Dee Kay LLC, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,337

(22) Filed: Jun. 2, 2022

(65) Prior Publication Data

US 2023/0014653 A1 Jan. 19, 2023

Related U.S. Application Data

(63) Continuation of application No. 16/715,028, filed on Dec. 16, 2019, now Pat. No. 11,372,083.

(51) Int. Cl.
*G01S 7/40* (2006.01)
*H01Q 3/26* (2006.01)
(Continued)

(52) U.S. Cl.
CPC ............ *G01S 7/4026* (2013.01); *G01S 7/354* (2013.01); *G01S 13/282* (2013.01);
(Continued)

(58) Field of Classification Search
CPC ...... G01S 7/4026; G01S 7/354; G01S 13/282; G01S 13/343; G01S 13/56; G01S 13/584; G01S 13/931; H01Q 3/267
(Continued)

(56) References Cited

U.S. PATENT DOCUMENTS 5,175,554 A * 12/1992 Mangiapane ....... G01S 13/9092
342/149
9,618,591 B1 * 4/2017 Radparvar ........... G01R 33/567
(Continued)

FOREIGN PATENT DOCUMENTS

EP 3021132 A1 * 5/2016 ........... G01S 13/343
EP 3021132 A1 5/2016
(Continued)

OTHER PUBLICATIONS

J.L. Chau et al., "Phase calibration approaches for radar interferometry and imaging configurations: equitorial spread results," Ann. Geophys., 26, 2333-2343, 2008.
(Continued)

*Primary Examiner* — Nuzhat Pervin
(74) *Attorney, Agent, or Firm* — Steven Stupp (57) ABSTRACT

A radar antenna calibration method includes: forming a detection matrix from signals detected by an arrangement of receive antennas in response to chirps transmitted by an arrangement of transmit antennas, the detection matrix having multiple rows corresponding to the chirps, multiple columns corresponding to a signal sample, and multiple planes corresponding the receive antennas; deriving a range matrix by performing a frequency transform on a portion of each row of the detection matrix; extracting a slice of the range matrix, with different rows of the slice being associated with different chirps and with different receive antennas; deriving a velocity matrix from the extracted slice by performing a frequency transform on a portion of each column of the extracted slice; analyzing the velocity matrix to determine a current peak width; and adjusting, based on the current peak width, phase shifts associated with one or more of the receive antennas.

21 Claims, 6 Drawing Sheets

(51) Int. Cl.

| | | |
|---|---|---|
| *G01S 7/35* | (2006.01) | |
| *G01S 13/931* | (2020.01) | |
| *G01S 13/56* | (2006.01) | |
| *G01S 13/58* | (2006.01) | |
| *G01S 13/34* | (2006.01) | |
| *G01S 13/28* | (2006.01) | |

(52) U.S. Cl.
CPC ............ *G01S 13/343* (2013.01); *G01S 13/56* (2013.01); *G01S 13/584* (2013.01); *G01S 13/931* (2013.01); *H01Q 3/267* (2013.01)

(58) Field of Classification Search
USPC ......................................................... 342/174
See application file for complete search history.

(56) References Cited

U.S. PATENT DOCUMENTS

| | | | | |
|---|---|---|---|---|
| 10,775,482 | B2* | 9/2020 | Santra | G01S 7/2883 |
| 2016/0131752 | A1* | 5/2016 | Jansen | G01S 13/42 |
| | | | | 342/27 |
| 2016/0252607 | A1* | 9/2016 | Saboo | G01S 13/584 |
| | | | | 342/107 |
| 2018/0143297 | A1* | 5/2018 | Jansen | G01S 13/42 |
| 2018/0172813 | A1* | 6/2018 | Rao | G06F 17/142 |
| 2019/0317191 | A1* | 10/2019 | Santra | G01S 13/881 |
| 2019/0391249 | A1* | 12/2019 | Takeuchi | G01S 13/536 |
| 2020/0049812 | A1* | 2/2020 | Jansen | G01S 13/4454 |
| 2020/0150260 | A1* | 5/2020 | Lang | G01S 13/42 |
| 2020/0309939 | A1* | 10/2020 | Subburaj | G01S 7/352 |
| 2020/0363518 | A1* | 11/2020 | Rao | G01S 7/354 |

FOREIGN PATENT DOCUMENTS

| | | | | |
|---|---|---|---|---|
| WO | 2016138238 | A1 | 9/2016 | |
| WO | WO-2016138238 | A1 * | 9/2016 | ............ G01S 13/02 |
| WO | 2020198290 | A1 | 10/2020 | |
| WO | WO-2020198290 | A1 * | 10/2020 | ........... G01S 13/343 |

OTHER PUBLICATIONS

Jason Yu et al., Adaptive Phase-Array Calibration using MIMO Radar Clutter, 2013 IEEE Radar Conference (RadarConf13), 5 pages.

Marlene Harter et al., "Self-Calibration of a 3-D Digital Beamforming Radar System for Automotive Applications with Installation Behind Automotive Covers," IEEE Transactions on Microwave Applications and Techniques, vol. 64, No. 9, 2994-3000, Sep. 2016.

Muhammad Z. Ikram et al., "Joint Antenna-Array Calibration and Direction of Arrival Estimation for Automotive Radars," 2016 IEEE Radar Conference (RadarConf16), 5 pages.

* cited by examiner

CALIBRATING ARRAY ANTENNAS BASED ON SIGNAL ENERGY DISTRIBUTION AS A FUNCTION OF VELOCITY

CROSS REFERENCE TO RELATED APPLICATIONS

This application is a continuation of U.S. patent application Ser. No. 16/715,028, "Calibrating Array Antennas Based on Signal Energy Distribution as a Function of Velocity," filed on Dec. 16, 2019 (now U.S. Pat. No. 11,372,083), the contents of which is incorporated herein by reference.

FIELD

This application relates generally to frequency-modulated continuous wave (FMCW) radar systems, and more particularly to systems that employ antenna calibration based on target detection.

BACKGROUND

In the quest for ever-safer and more convenient transportation options, many car manufacturers are developing self-driving cars which require an impressive number and variety of sensors, often including arrays of acoustic and/or electromagnetic sensors to monitor the distance between the car and any nearby persons, pets, vehicles, or obstacles. Attempts to calibrate sensors based on one or more detected targets (e.g., vehicles) have not been wholly satisfactory. Thus, there is room for improvement in the art.

SUMMARY

In accordance with at least one example of this disclosure, a radar detection method with receive antenna calibration comprises: forming a detection matrix from signals detected by an arrangement of receive antennas in response to chirps transmitted by an arrangement of transmit antennas, the detection matrix having multiple rows each corresponding to one of said chirps, multiple columns each corresponding to a sample of said signals, and multiple planes each corresponding to one of said receive antennas; deriving a range matrix by performing a frequency transform on a portion of each row of the detection matrix; extracting a slice of the range matrix having only one layer, with different rows of the slice being associated with different chirps and with different receive antennas; deriving a velocity matrix from the extracted slice by performing a frequency transform on a portion of each column of the extracted slice; analyzing the velocity matrix to determine a current peak width; and adjusting, based on the current peak width, phase shifts associated with one or more of the receive antennas.

In accordance with one or more other examples of this disclosure, a radar transceiver comprises: one or more transmitter circuits configured to drive a transmit antenna arrangement to emit a signal towards one or more objects, the emitted signal comprising a plurality of chirps; an arrangement of receivers, wherein each receiver is configured to detect a signal from a receive antenna during a detection period, each receive antenna having an associated phase shift that is adjustable relative to the other receiver antennas, and wherein each of the detected signals corresponds to the emitted signal; a processor coupled to the one or more transmitter circuits and the arrangement of receivers, wherein the processor is configured to perform a method comprising: forming a detection matrix from the detected signals, the detection matrix having multiple rows each corresponding to one of said chirps, multiple columns each corresponding to a sample of said signals, and multiple planes each corresponding to one of said receive antennas; deriving a range matrix by performing a frequency transform on a portion of each row of the detection matrix; extracting a slice of the range matrix having only one layer, with different rows of the slice being associated with different chirps and with different receive antennas; deriving a velocity matrix from the extracted slice by performing a frequency transform on a portion of each column of the extracted slice; analyzing the velocity matrix to determine a current peak width; and adjusting, based on the current peak width, phase shifts associated with one or more of the receive antennas.

In accordance with at least one other example of this disclosure, a system for calibrating antennas comprises a non-transitory computer readable medium storing instructions executable by a processor, wherein the instructions comprise instructions to perform a radar detection method with receive antenna calibration as described above.

DETAILED DESCRIPTION

The accompanying drawings and following detailed description do not limit the disclosure, but on the contrary, they provide the foundation for understanding all modifications, equivalents, and alternatives falling within the scope of the appended claims. Specific configurations, parameter values, and operation examples are provided for the purposes of explanation rather than for circumscribing any scope of disclosure.

Figure 1:
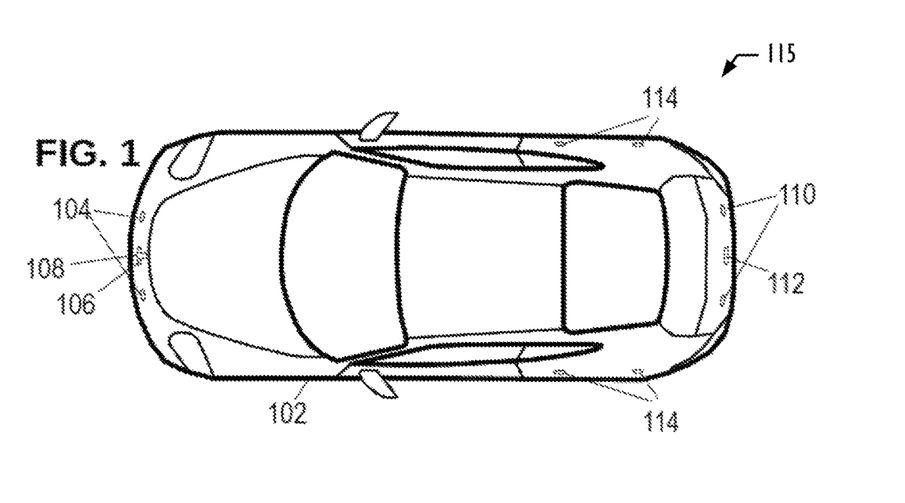
FIG. 1 is an overhead view of an illustrative vehicle equipped with sensors.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid-range sensing (e.g., for rear collision warning) may be placed behind the back bumper cover. Antennas 114 for short range sensing (e.g., for blind spot monitoring and side obstacle detection) may be placed behind the car fenders. Each antenna and each set of antennas may be grouped in one or more arrays. Each array may be controlled by a radar array controller (205). Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
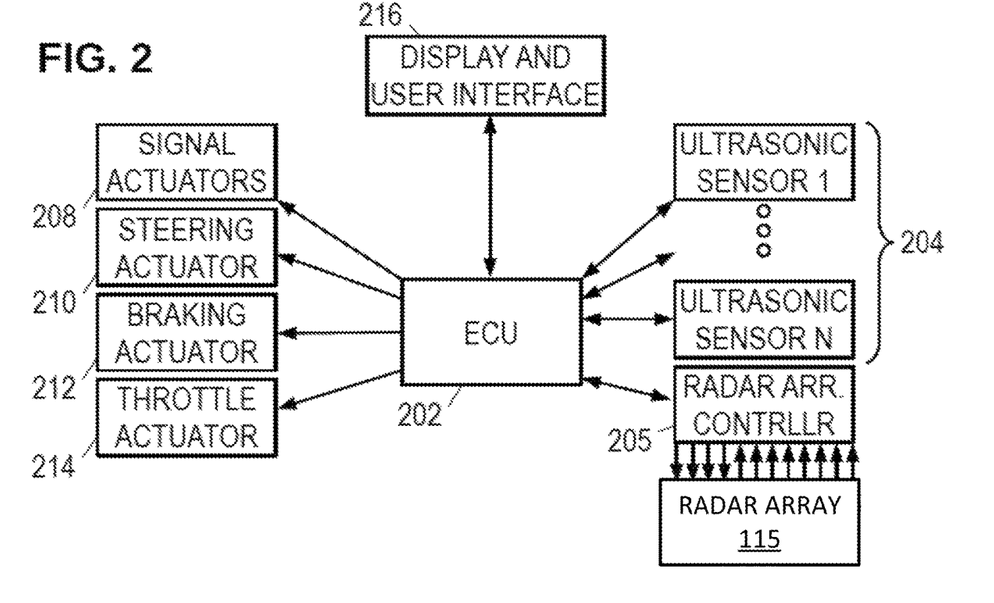
FIG. 2 is a block diagram of a driver-assistance system, in accordance with an example of this disclosure.

FIG. 2 shows an electronic control unit (ECU) 202 coupled to the various ultrasonic sensors 204 and a radar array controller 205 as the center of a star topology. Other topologies including serial, parallel, and hierarchical (tree) topologies, are also suitable and contemplated for use in accordance with the principles disclosed herein. The radar array controller 205 couples to the transmit and receive antennas in the radar antenna array 106 to transmit electromagnetic waves, receive reflections, and determine a spatial relationship of the vehicle to its surroundings. The radar array controller 205 couples to carrier signal generators (404). In at least one example, the radar array controller 205 controls the timing and order of actuation of a plurality of carrier signal generators (404).

To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more ECU 202, and may be used by the ECU 202 to determine the automobile's status. The ECU 202 may further act on the status and incoming information to actuate various signaling and control transducers to adjust and maintain the automobile's operation. Among the operations that may be provided by the ECU 202 are various driver-assist features including automatic parking, lane following, automatic braking, and self-driving.

To gather the necessary measurements, the ECU 202 may employ a MIMO radar system. Radar systems operate by emitting electromagnetic waves which travel outward from the transmit antenna before being reflected towards a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector and its velocity relative to the vehicle. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented.

Figure 3:
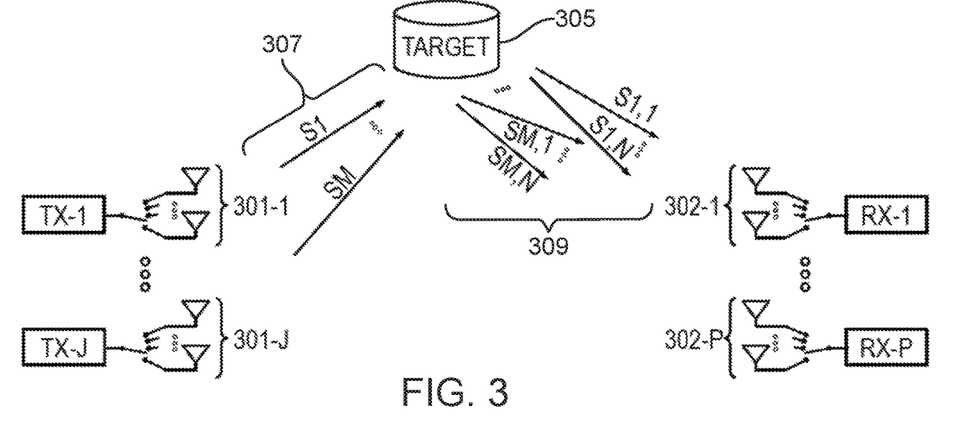
FIG. 3 is a schematic of a reconfigurable multiple input multiple output radar system, in accordance with an example of this disclosure.

FIG. 3 shows an illustrative system having a MIMO configuration, in which J transmitters are collectively coupled to M transmit antennas 301 to send transmit signals 307. The M possible signals 307 may variously reflect from one or more targets to be received as receive signals 309 via N receive antennas 302 coupled to P receivers. Each receiver may extract the amplitude and phase or travel delay associated with each of the M transmit signals 307, thereby enabling the system to obtain N*M measurements (though only J*P of the measurements may be obtained concurrently). The processing requirements associated with each receiver extracting J measurements can be reduced via the use of time division multiplexing and/or orthogonal coding. The available antennas are systematically multiplexed to the available transmitters and receivers to collect the full set of measurements for radar imaging.

Figure 4:
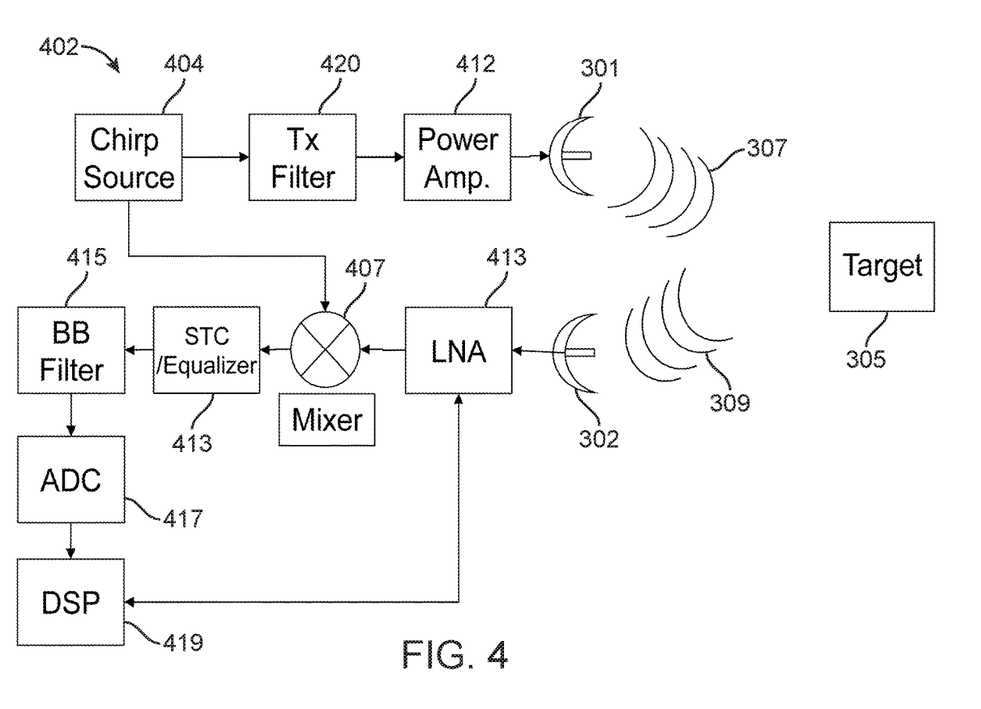
FIG. 4 illustrates a radar system in block diagram form, in accordance with an example of this disclosure.

FIG. 4 illustrates a radar transceiver circuit 402 in block diagram form, in accordance with an example of this disclosure. In at least one example, the radar transceiver circuit 402 is implemented as an integrated circuit in a packaged chip. Radar transceiver circuit 402 includes a carrier signal generator 404, a transmission filter 420, an amplifier 412, and transmit antennas 301 which can transmit signals 307 (e.g., chirps 409) based on the output of the carrier signal generator 404. Radar transceiver circuit 402 also includes receiver antennas 302, a low noise amplifier 413, and a mixer 407. Mixer 407 mixes signals (e.g., 411) detected by antennas 302 with the signal from the carrier signal generator 404. Low noise amplifier 413 is used to amplify signals 411 detected by antennas 302. Radar transceiver circuit 402 also includes a sensitivity time controller and equalizer 413, a broadband filter 415, an analog-to-digital converter 417 and a digital signal processor 419. The digital signal processor 419 and low noise amplifier 413 can be coupled for bi-directional communication as shown.

In examples of this disclosure, carrier signal generator 404 is coupled to the radar array controller 205. Carrier signal generator 404 includes a chirp generator to create a frequency-modulated continuous-wave (FMCW) signal. The chip rate of the carrier signal generator 404 may be controlled by the radar array controller 205. In at least one example, the carrier signal generator 404 can be deactivated by the radar array controller 205 to provide an unmodulated carrier signal. The carrier signal generator 404 may be implemented as a local oscillation (LO) signal generator as a fractional-N phase lock loop (PLL) with a $\Sigma\Delta$ controller, or as a direct-digital synthesis (DDS) generator.

Carrier signal generator 404 is connected to transmitter (TX) 301 through transmission filter 420 and amplifier 412. Carrier signal generator 404 is connected to receiver (RX) through mixer 407 and low noise amplifier 413. Carrier signal generator 404 generates a signal (e.g., a chirp signal). Amplifier 412 receives the signal from carrier signal generator 404 and the signal 307 is transmitted by transmit antennas 301.

Figure 5:
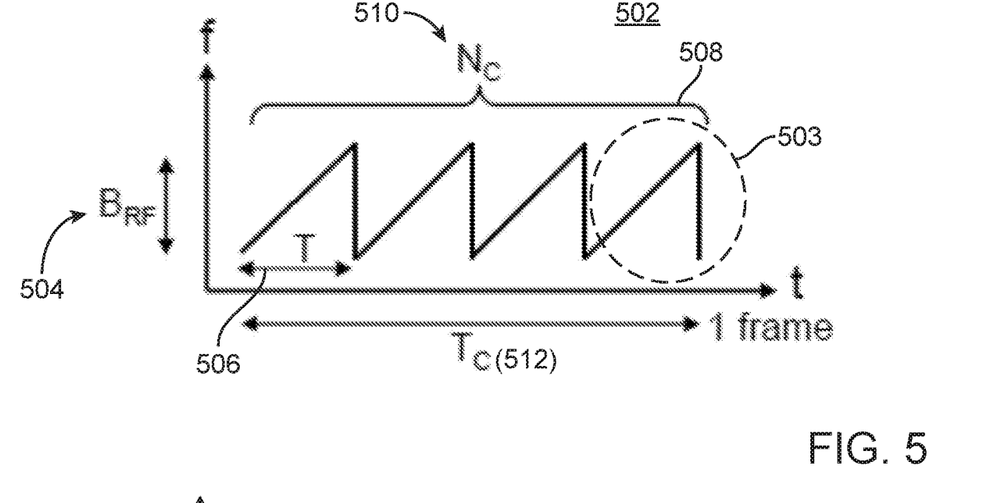
FIG. 5 illustrates a chirp signal profile 502, in accordance with an example of this disclosure.

FIG. 5 illustrates a chirp signal profile 502, in accordance with an example of this disclosure. FMCW radar (e.g., 402) transmits chirp signals in order to detect a target's 305 range and relative velocity. A chirp signal is a frequency-modulated radio frequency (RF) signal whose frequency increases or decreases linearly over a time period. A chirp signal is composed of a series of individual chirps (e.g., 503). A chirp 503 is characterized by, among other things, its carrier frequency, chirp bandwidth 504 and chirp duration 506. A chirp sequence 508 is a portion of a chirp signal, and is defined by the number of chirps $N_C$ 510 and by a chirp period $T_C$ 512. FIG. 5 shows four chirps 503 of duration 506 T. Hence, the value of $N_C$ is 4 in FIG. 5.

During operation, the signals (e.g., 309) that are reflected off different objects (targets) 305 are received by the radar 402 and mixed with the transmitted signal to generate an intermediate frequency (IF) signal whose frequency depends on the target range and relative velocity. An IF is a frequency to which a carrier wave is shifted as an intermediate step in transmission or reception. The IF signal is sampled by an analog-to-digital converter (ADC) (e.g., 417) at a sampling frequency $f_s$ and processed by a processor (e.g., ECU 202, DSP 419).

Figures 7A, 7B:
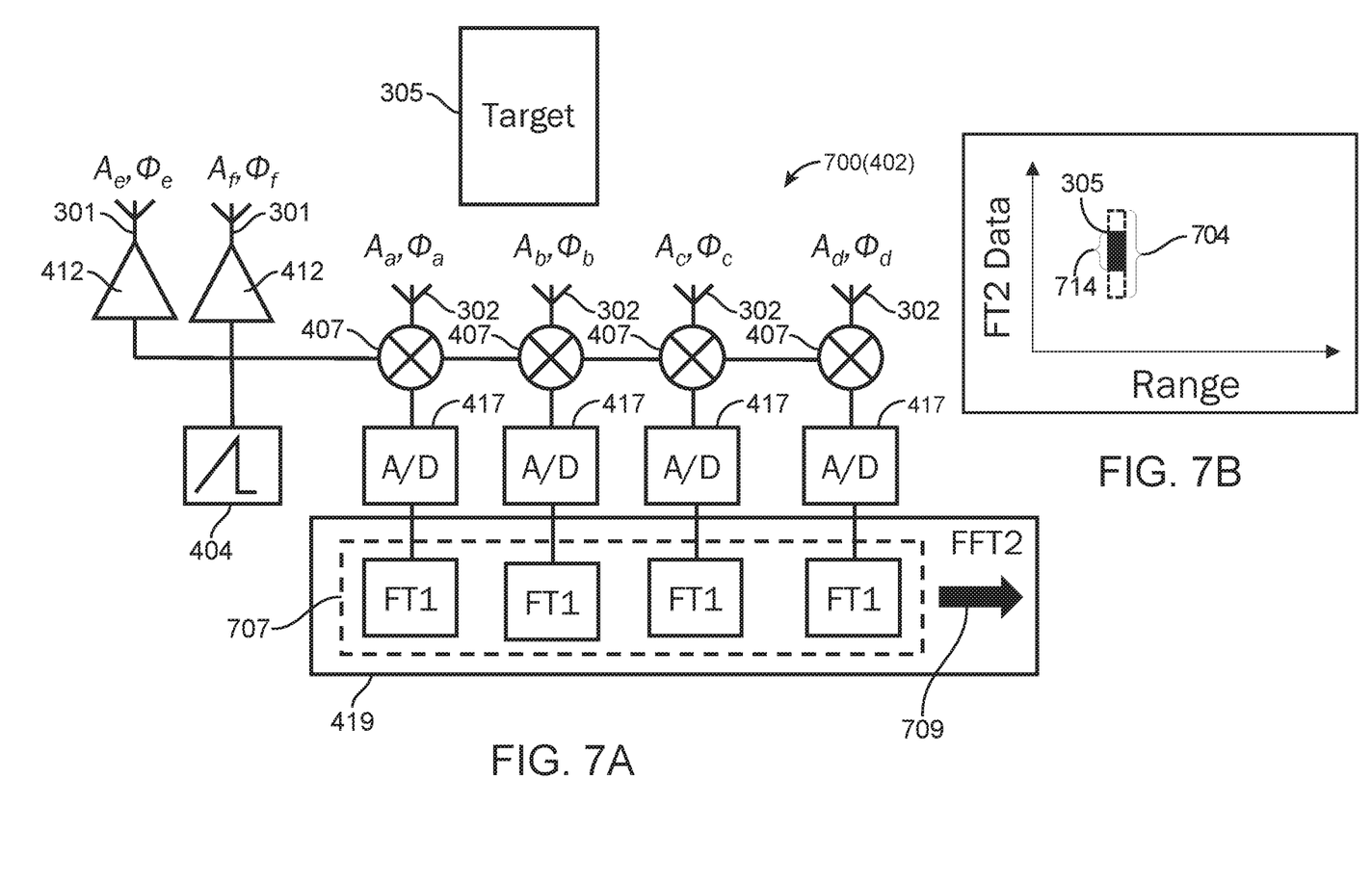
FIG. 7A illustrates a radar system, in accordance with an example of this disclosure.
FIG. 7B illustrates a plot of the results of a method of using a radar system, in accordance with an example of this disclosure.

FIG. 7A illustrates a radar transceiver 700 (e.g., 402) in block diagram form, in accordance with an example of this disclosure. Radar transceiver 700 includes a carrier signal generator 404, amplifiers 412, and transmit antennas 301 which can transmit signals (e.g., 307) based on the output of the carrier signal generator 404. Radar transceiver 700 also includes receiver antennas 302 and mixers 407. Mixers 407 mix signals (e.g., 309) detected by antennas 302 with the signal from the carrier signal generator 404. The detected signals are converted to digital signals by analog-to-digital converter(s) 417. Processor 419 applies a frequency transform (e.g., a Fast Fourier transform—FFT1) to the digital output of analog-to-digital converter(s) 417 for each receive antenna 302, creating a three-dimensional matrix 707 in which each column stores reflected signal energy as a function of range to the target, each row stores reflected signal energy corresponding to the different chirps, and each layer corresponds to the transformed data from each receive antenna 302. The number of layers for transceiver 700 would be four. In examples of this disclosure, processor 419 forms a new single-layer two-dimensional matrix obtained by slicing matrix 707 across the layers; the rows are arranged one after the other, where each row is picked from a consecutive layer. In examples of this disclosure the rows of the new matrix are taken from consecutive layers associated with the same chirp number; in another example of this disclosure, the rows of the new matrix are taken from consecutive layers associated with consecutive chirps. In examples of this disclosure, processor 419 applies 709 a second frequency transform, (FFT2) to columns of the new matrix to obtain a two dimensional matrix in which the columns store reflected signal energy as a function of FT2 bins (which may be treated as representing apparent target velocity). The described operations of transceiver 700 can be repeated, e.g., over multiple measurement cycles on a given target 305, to adaptively calibrate the phase φ of each of the receive antennas 302, as explained further below.

FIG. 7B illustrates a plot 711 of the results of the second frequency transform with respect to target 305. When target 305 is initially detected by receive antennas, the transformed data may show reflected signal energy somewhat dispersed over multiple FT2 bins (as indicated by rectangle 704). As each receiver's amplitudes and phases are tuned, the reflected signal energy becomes concentrated in a smaller number of velocity bins (as indicated by rectangle 714). The energy distribution 704 peaks at a local maximum value. The peak width of the distribution may be defined as the difference between the FT2 bins (apparent velocities or, as discussed further below, between apparent angles) at which the energy distribution is half of the local maximum value. The energy distribution 714 is more concentrated, as can be determined by its smaller peak width and/or its higher local maximum value. At least one technical advantage of transceiver 700 is that receiver antennas 302 can be quickly calibrated "on the fly", minimizing the need for dedicated calibration intervals.

Figure 6A:
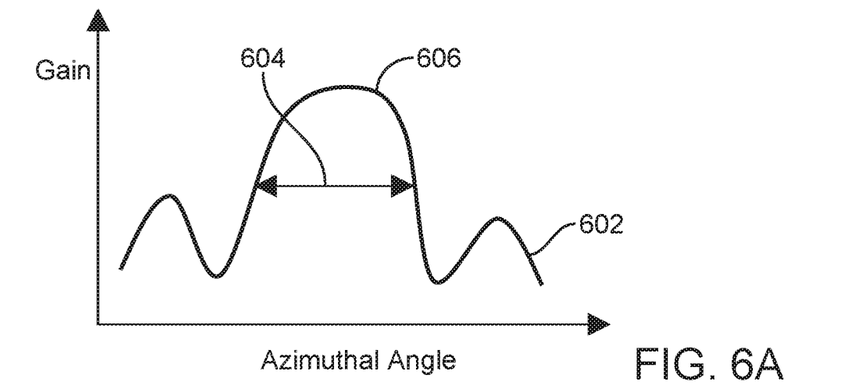
FIGS. 6A-B illustrate antenna array radiation patterns, in accordance with examples of this disclosure.
Figure 6B:
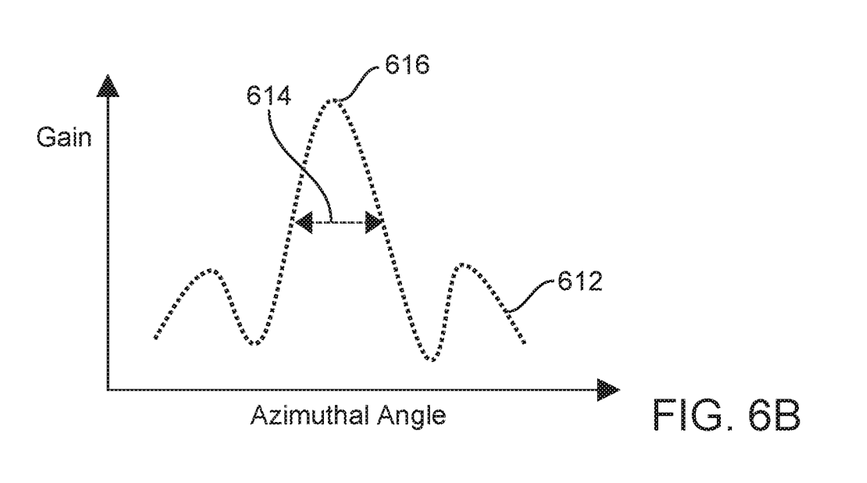

FIGS. 6A-B illustrate antenna array radiation patterns in accordance with examples of this disclosure. FIG. 6A illustrates a collective radiation pattern 602 of an antenna array, which is associated with a transmit circuit or a receive circuit that is not well calibrated. Individual signal amplitudes are not equal and/or relative phases are not equal. FIG. 6B illustrates a collective radiation pattern 612 of an antenna array, which is associated with a transmit circuit or a receive circuit that is either ideal or well calibrated. Notably, the radiation pattern 602 of FIG. 6A has a beam width 604 which is wider than the beam width 614 of pattern 612 in FIG. 6B. Beam width 604 is measured between the points at which the gain is half of the local maximum 606, and similarly beam width 614 is measured between the points at which the gain is half of the maximum 616. If the energy distribution in FIG. 7B becomes more concentrated in response to adjustments of relative amplitudes and phases, the calibration process may be safely assumed to be enhancing the antenna array's collective radiation pattern by narrowing its effective beam width.

Figures 8A, 8B, 8C, 8D:
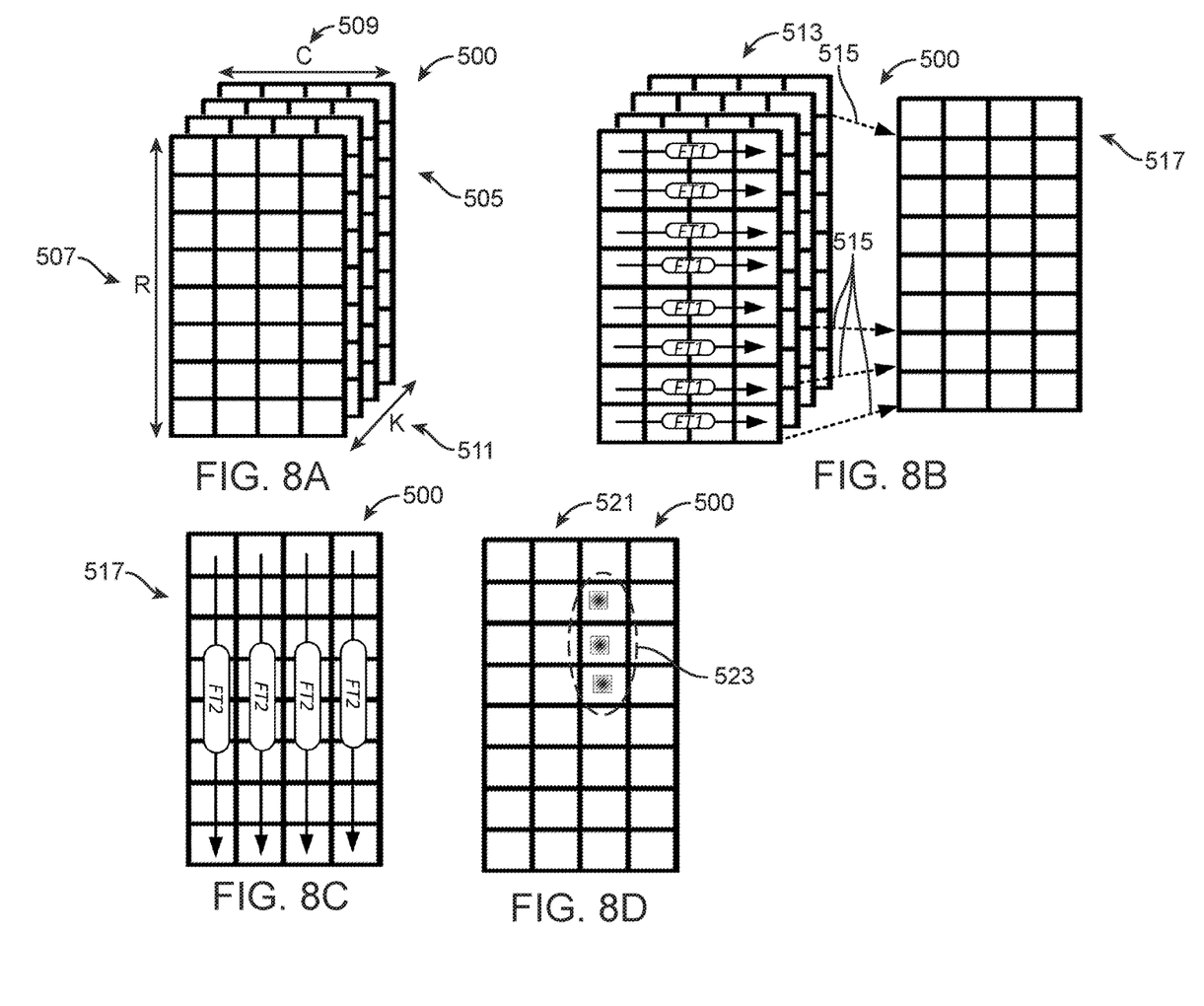
FIGS. 8A-D illustrate a radar detection method, in accordance with an example of this disclosure.

FIGS. 8A-D illustrate a radar detection method 500 with receive antenna calibration based on signal energy distribution as a function of velocity. As illustrated in FIG. 8A, the method 500 includes forming a detection matrix 505 from signals detected by an arrangement of receive antennas in response to a sequence of chirps transmitted by an arrangement of transmit antennas 301. The detection matrix 505 has N rows 507, with each row 507 corresponding to one of the chirps. The detection matrix 505 has M columns 509, with each column 509 corresponding to a sample within each chirp. The detection matrix 505 has K planes 511. Each plane 511 corresponds to one receive antenna 302. As illustrated in FIG. 8B, the method 500 further includes deriving a three-dimensional range matrix 513 by performing a frequency transform (FT1) on some or all of each row 507 of the detection matrix 505, and further includes extracting 515 a two-dimensional slice 517 of the range matrix 513, with different rows 507 of the slice 517 being associated with different with different receive antennas 302 and optionally with different chirps. Optionally, one or more targets with high signal amplitude are identified at this stage. As illustrated in FIG. 8C, the method 500 further includes deriving 519 a velocity matrix 521 from the extracted slice 517 by performing a frequency transform (e.g., FT2) on some or all of each column 509 of the extracted slice 517. (Those columns not having reflected signal energy from the identified targets may be excluded to reduce processing requirements.) The velocity matrix 521 is analyzed to determine a peak width 523 and the phase shifts of the receive antennas 302 are adjusted so as to narrow the peak width.

Figures 9A, 9B, 9C, 9D:
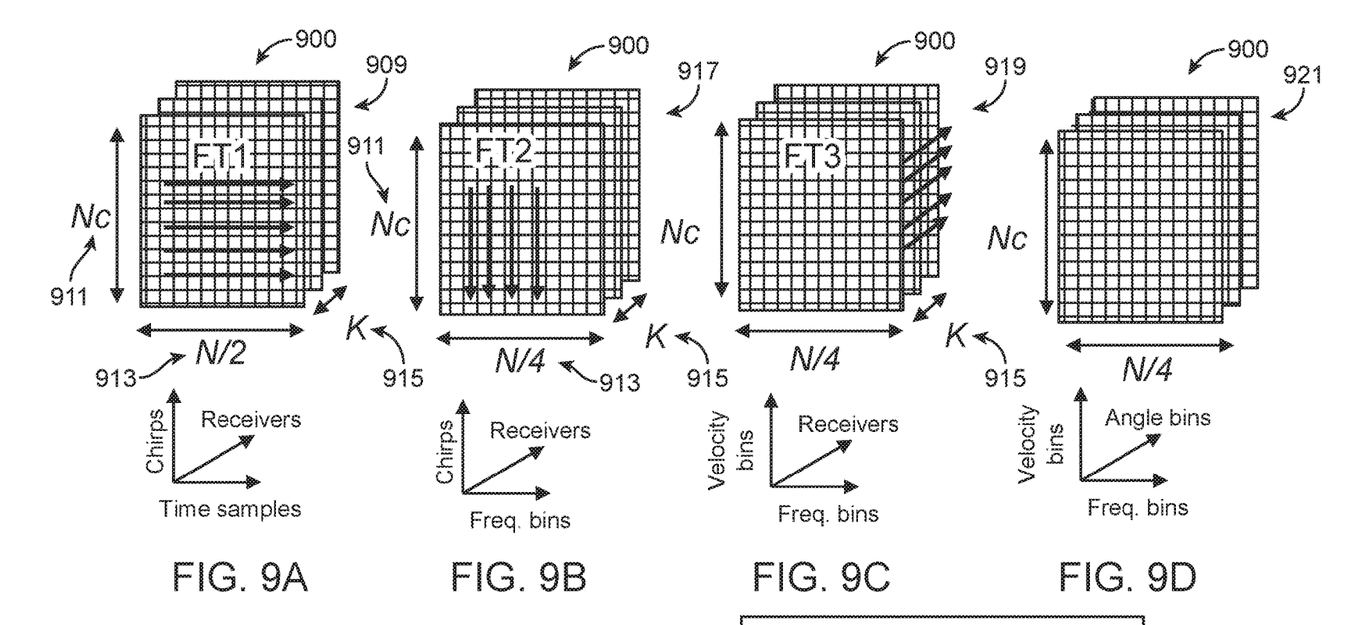
FIGS. 9A-9D illustrate another radar detection method, in accordance with an example of this disclosure.

FIGS. 9A-9D show an illustrative radar detection method 900 with transmit and/or receive antenna array calibration based on reflected signal energy distribution as a function of angle rather than velocity. As illustrated in FIG. 9A, the method 900 comprises forming a three-dimensional detection matrix 909 (using e.g., processor 202, 419) from signals 309 detected by an arrangement of receive antennas (302) in response to chirps (503) transmitted by an arrangement of transmit antennas (301). The detection matrix 909 has multiple rows $N_C$. Each row 911 corresponds to one chirp (503). The detection matrix 909 formed by the processor has multiple columns 913, each of which corresponds to a respective sample within each chirp signal. The detection matrix 909 formed by the processor also has multiple planes 915, each of which corresponds to one receive antenna (302) which detected the chirp signals. As illustrated in FIG. 9B, the method 900 further includes deriving a range matrix by performing a frequency transform (e.g., FFT1) on a portion of each row 911 of the detection matrix 909. Optionally, one or more targets with high signal amplitude are identified at this stage. As illustrated in FIG. 9C, the method 900 further includes deriving a velocity matrix 919 by performing a frequency transform (e.g., FFT2) on a portion of each column 913 (or only those columns having signal energy from the identified targets) of the range matrix 917. Optionally, one or more targets with high signal amplitude are identified at this stage. As illustrated in FIG. 9D, the method 900 further includes deriving a direction-of-arrival matrix 921 by performing a frequency transform (e.g., FT3) on a portion of one or more layers 915 of the velocity matrix 919. According to the method 900, the direction-of-arrival matrix 921 is analyzed using the processor to determine the width of one or more peaks in the reflected signal energy distribution as a function of angle. In one example of the method 900, the phase shifts φ of one or more receive antennas (302) are adjusted based on the current peak width. In another example of the method 900, the phase shifts φ of one or more transmit antennas (301) are adjusted based on the current peak width.

Figure 9E:
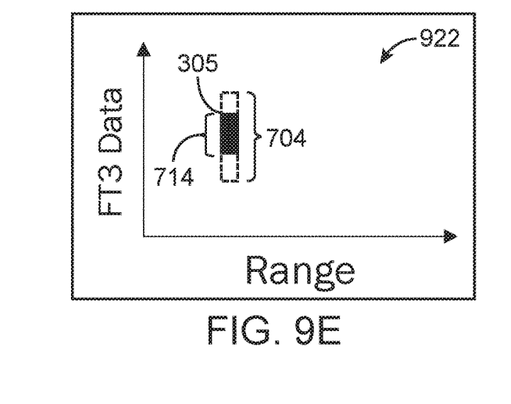
FIG. 9E illustrates a plot corresponding to the peak widths associated with chirps detected according to the method illustrated in FIGS. 9A-D.

FIG. 9E illustrates a plot 922 corresponding to the reflected signal energy distribution from a target detected by the receive antennas (302). By adjusting the phase shifts φ of the antennas (301 and/or 302), the peak width of the FFT3 data can be narrowed from a first value 604 to a second value 614. In accordance with at least one example of this disclosure, the information of plot 922 can be displayed by a display device.

Though the operations described herein may be set forth sequentially for explanatory purposes, in practice the method may be carried out by multiple components operating concurrently and perhaps even speculatively to enable out-of-order operations. The sequential discussion is not meant to be limiting. Moreover, the focus of the foregoing discussions has been radar sensors, but the principles are applicable to any pulse-echo or continuous-wave travel time measurement systems. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for radar detection with antenna calibration, comprising:
   forming a detection matrix from signals associated with an arrangement of receive antennas and corresponding to chirps associated with an arrangement of one or more transmit antennas, wherein the detection matrix comprises multiple first sets of entries along a first dimension of the matrix and a given first set of entries in the first sets of entries corresponds to a given chirp in the chirps, wherein the detection matrix comprises multiple second sets of entries along a second dimension of the matrix and a given second set of entries in the second sets of entries corresponds to a sample of the signals, and the detection matrix comprises multiple planes corresponding to the first dimension and the second dimension and a given plane in the planes corresponds to a given receive antenna in the receive antennas;
   deriving a range matrix by performing a frequency transform on a portion of the first sets of entries in the detection matrix;
   extracting a slice of the range matrix in which third sets of entries along the first dimension of the slice are associated with different chirps and with different receive antennas;
   deriving a velocity matrix from the extracted slice by performing a frequency transform on a portion of fourth sets of entries along the second dimension of the slice;
   analyzing the velocity matrix to determine a current peak width; and
   adjusting, based at least in part on the current peak width, phase shifts associated with one or more of the receive antennas.

2. The method of claim 1, wherein adjusting the phase shifts associated with one or more of the receive antennas comprises repeating the forming, the deriving the range matrix, the extracting, the deriving the velocity matrix, and the analyzing to iteratively minimize the current peak width.

3. The method of claim 1, wherein adjusting the phase shifts associated with one or more of the receive antennas comprises controlling one or more phase shifters conveying the signals from the receive antennas in the arrangement of receive antennas.

4. The method of claim 1, wherein forming the detection matrix from signals detected by the arrangement of receive antennas comprises processing the signals to add respective phase shifts as determined by the adjusting.

5. The method of claim 1, wherein the arrangement of one or more transmit antennas comprises exactly one transmit antenna.

6. The method of claim 1, wherein extracting the slice of the range matrix comprises extracting at least one of the first sets of entries from each of the planes.

7. The method of claim 6, wherein extracting at least the one of the first sets of entries from each of the planes comprises extracting two or more of the first sets of entries and each of the two or more of the first sets of entries corresponds to a different chirp in the chirps.

8. The method of claim 1, further comprising:
   extracting a second slice of the range matrix in which fifth sets of entries corresponding to a single receive antenna in the receive antennas, wherein a given fifth set of entries in the fifth set of entries along the first dimension associated with different chirps and with different transmit antennas;
   deriving a second velocity matrix from the second slice by performing a frequency transform on a portion of sixth sets of entries along the second dimension of the second slice;
   analyzing the second velocity matrix to determine a second peak width; and
   adjusting, based at least in part on the second peak width, phase shifts associated with one or more of the one or more transmit antennas.

9. A radar transceiver, comprising:
   one or more transmitter circuits configured to drive a transmit antenna arrangement to emit a signal towards one or more objects, wherein the emitted signal comprises multiple chirps;
   an arrangement of receivers, wherein a given receiver in the arrangement of receivers is configured to detect a signal from a given receive antenna in receive antennas associated with the given receiver during a detection period, the given receive antenna having an associated phase shift that is adjustable relative to a remainder of the receive antennas, and wherein the detected signal corresponds to the emitted signal;

a processor, coupled to the one or more transmitter circuits and the arrangement of receivers, configured to perform operations comprising:

forming a detection matrix from detected signals, wherein the detection matrix comprises multiple first sets of entries along a first dimension of the matrix and a given first set of entries in the first sets of entries corresponds to a given chirp in the chirps, wherein the detection matrix comprises multiple second sets of entries along a second dimension of the matrix and a given second set of entries in the second sets of entries corresponds to a sample of the signals, and the detection matrix comprises multiple planes corresponding to the first dimension and the second dimension and a given plane in the planes corresponds to the given receive antenna in the receive antennas;

deriving a range matrix by performing a frequency transform on a portion of the first sets of entries in the detection matrix;

extracting a slice of the range matrix in which third sets of entries along the first dimension of the slice are associated with different chirps and with different receive antennas;

deriving a velocity matrix from the extracted slice by performing a frequency transform on a portion of fourth sets of entries along the second dimension of the slice;

analyzing the velocity matrix to determine a current peak width; and adjusting, based at least in part on the current peak width, phase shifts associated with one or more of the receive antennas.

10. The radar transceiver of claim 9, wherein adjusting the phase shifts associated with one or more of the receive antennas comprises repeating the forming, the deriving the range matrix, the extracting, the deriving the velocity matrix, and the analyzing to iteratively minimize the current peak width.

11. The radar transceiver of claim 9, wherein adjusting the phase shifts associated with one or more of the receive antennas comprises controlling one or more phase shifters conveying the signals from the receive antennas in the arrangement of receive antennas.

12. The radar transceiver of claim 9, wherein forming the detection matrix from signals detected by the arrangement of receive antennas comprises processing the signals to add respective phase shifts as determined by the adjusting.

13. The radar transceiver of claim 9, wherein the transmit antenna arrangement comprises exactly one transmit antenna.

14. The radar transceiver of claim 9, wherein extracting the slice of the range matrix comprises extracting at least one of the first sets of entries from each of the planes.

15. The radar transceiver of claim 14, wherein extracting at least the one of the first sets of entries from each of the planes comprises extracting two or more of the first sets of entries and each of the two or more of the first sets of entries corresponds to a different chirp in the chirps.

16. The radar transceiver of claim 9, wherein the operations further comprise:

extracting a second slice of the range matrix in which fifth sets of entries corresponding to a single receive antenna in the receive antennas, wherein a given fifth set of entries in the fifth set of entries along the first dimension associated with different chirps and with different transmit antennas in the transmit antenna arrangement;

deriving a second velocity matrix from the second slice by performing a frequency transform on a portion of sixth sets of entries along the second dimension of the second slice;

analyzing the second velocity matrix to determine a second peak width; and adjusting, based at least in part on the second peak width, phase shifts associated with one or more transmit antennas in the transmit antenna arrangement.

17. A non-transitory computer readable medium storing program instructions configured to be executed by a processor in a system, wherein, when executed by the processor, the system performs operations comprising:

forming a detection matrix from signals associated with an arrangement of receive antennas and corresponding to chirps associated with an arrangement of one or more transmit antennas, wherein the detection matrix comprises multiple first sets of entries along a first dimension of the matrix and a given first set of entries in the first sets of entries corresponds to a given chirp in the chirps, wherein the detection matrix comprises multiple second sets of entries along a second dimension of the matrix and a given second set of entries in the second sets of entries corresponds to a sample of the signals, and the detection matrix comprises multiple planes corresponding to the first dimension and the second dimension and a given plane in the planes corresponds to a given receive antenna in the receive antennas;

deriving a range matrix by performing a frequency transform on a portion of the first sets of entries in the detection matrix;

extracting a slice of the range matrix in which third sets of entries along the first dimension of the slice are associated with different chirps and with different receive antennas;

deriving a velocity matrix from the extracted slice by performing a frequency transform on a portion of fourth sets of entries along the second dimension of the slice;

analyzing the velocity matrix to determine a current peak width; and adjusting, based at least in part on the current peak width, phase shifts associated with one or more of the receive antennas.

18. The non-transitory computer readable medium of claim 17, wherein adjusting the phase shifts associated with one or more of the receive antennas comprises repeating the forming, the deriving the range matrix, the extracting, the deriving the velocity matrix, and the analyzing to iteratively minimize the current peak width.

19. The non-transitory computer readable medium of claim 17, wherein adjusting the phase shifts associated with one or more of the receive antennas comprises controlling one or more phase shifters conveying the signals from the receive antennas in the arrangement of receive antennas.

20. The non-transitory computer readable medium of claim 17, wherein forming the detection matrix from signals detected by the arrangement of receive antennas comprises processing the signals to add respective phase shifts as determined by the adjusting.

21. The non-transitory computer readable medium of claim 17, wherein the operations further comprise:

extracting a second slice of the range matrix in which fifth sets of entries corresponding to a single receive antenna in the receive antennas, wherein a given fifth set of entries in the fifth set of entries along the first dimension associated with different chirps and with different transmit antennas;

deriving a second velocity matrix from the second slice by performing a frequency transform on a portion of sixth sets of entries along the second dimension of the second slice;

analyzing the second velocity matrix to determine a second peak width; and adjusting, based at least in part on the second peak width, phase shifts associated with one or more of the one or more transmit antennas.

\* \* \* \* \*